Figure 1:
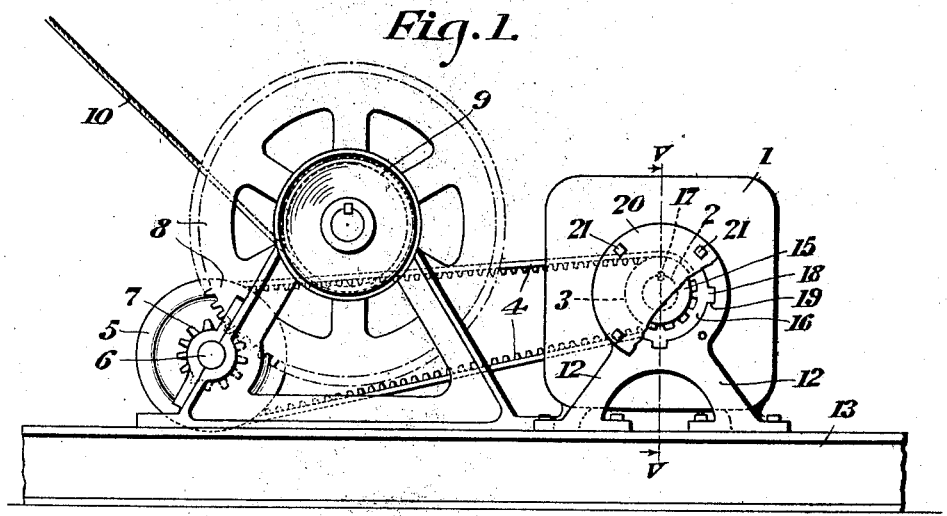

L. C. VITTORIO.
BRAKE FOR ELECTRIC MOTOR OPERATED HOISTS.
APPLICATION FILED AUG. 20, 1920.

1,374,258.

Patented Apr. 12, 1921.

2 SHEETS—SHEET 1.

Inventor
Luxa Carlo Vittorio

By his Attorneys

L. C. VITTORIO.
BRAKE FOR ELECTRIC MOTOR OPERATED HOISTS.
APPLICATION FILED AUG. 20, 1920.

1,374,258.

Patented Apr. 12, 1921.
2 SHEETS—SHEET 2.

Inventor
Luxa Carlo Vittorio

By David Davis his Attorneys.

UNITED STATES PATENT OFFICE.

LUXA CARLO VITTORIO, OF EMERSON, NEW JERSEY, ASSIGNOR TO THOMAS & BUCKLEY HOISTING CO., OF NEW YORK, N. Y., A CORPORATION OF NEW YORK.

BRAKE FOR ELECTRIC-MOTOR-OPERATED HOISTS.

1,374,258.     Specification of Letters Patent.     Patented Apr. 12, 1921.

Application filed August 20, 1920. Serial No. 404,766.

*To all whom it may concern:*

Be it known that I, LUXA CARLO VITTORIO, a citizen of Austria, and resident of Emerson, in the county of Bergen and State of New York, have invented certain new and useful Improvements in Brakes for Electric-Motor-Operated Hoists, (Case A,) of which the following is a specification.

This invention relates to improvements in brakes for electric-motor-operated hoists and more particularly to automatically operating braking means for permitting rotation of the armature shaft of the hoist motor in a direction to lift the load when current is supplied to the motor and preventing reversal of the shaft when the current is cut off.

The invention has for its object to provide a simple brake mechanism for preventing reversal of the armature shaft of the motor and consequent dropping of the load when the current is cut off which is quick and positive in action and is so constructed as to reduce to a minimum the possibility of the same getting out of working order.

Figure 2:
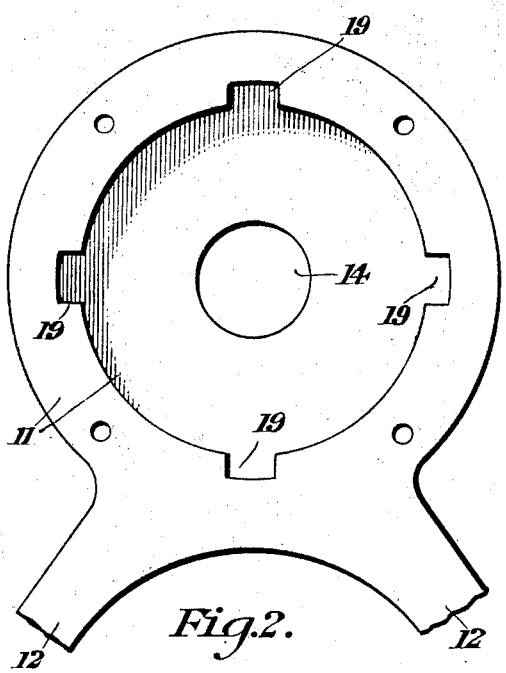
Figure 3:
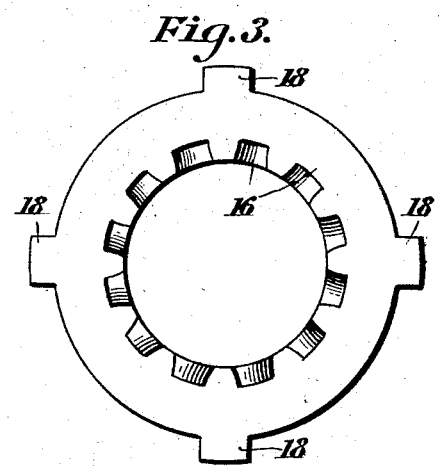
Figure 4:
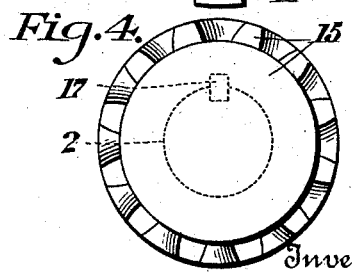
Figure 5:
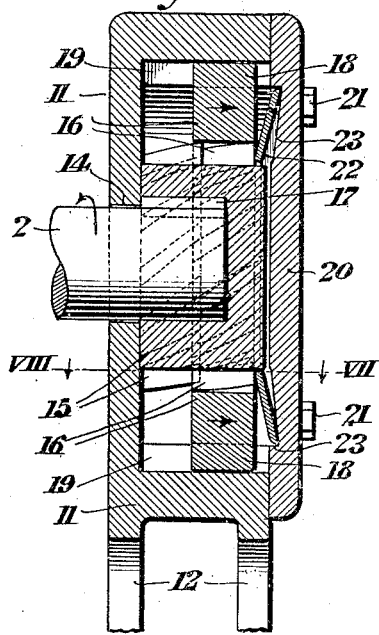
Figure 6:
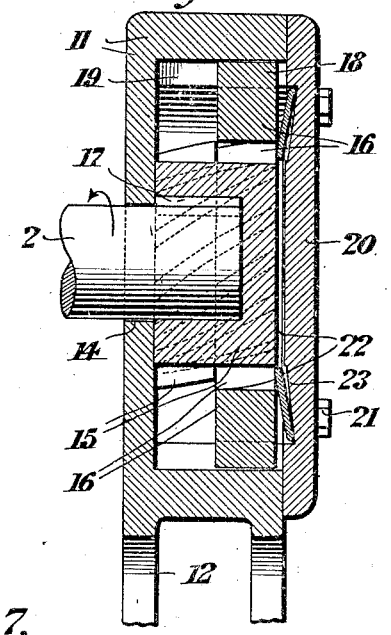
Figure 8:
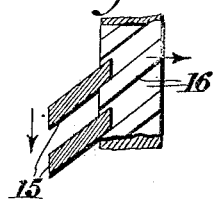
Figure 7:
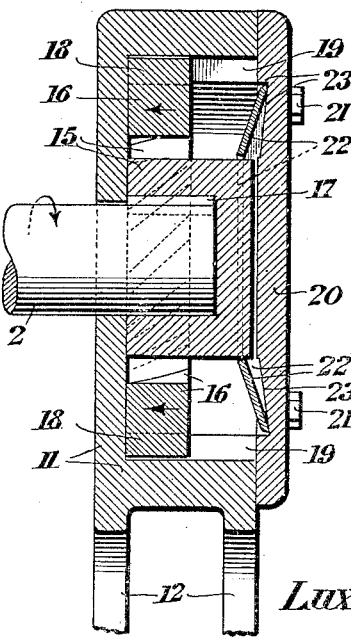
Figure 9:
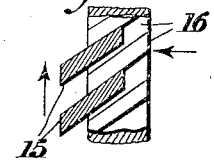

In the drawings:

Figure 1 is a fragmentary side elevation of an electric-motor-operated hoisting apparatus provided with the improved brake mechanism;

Figs. 2, 3 and 4 end views of parts of the brake;

Fig. 5 an enlarged vertical section on the line V—V of Fig. 1 showing the releasing action of the brake mechanism when the motor is started;

Fig. 6 a view similar to Fig. 5 showing the normal position of the parts when the motor is running;

Fig. 7 a view similar to Fig. 5 showing the parts in position for locking the motor shaft against reverse rotation; and Figs. 8 and 9 detail sections on the line VIII—VIII of Fig. 5, illustrating the cam action of the teeth of spiral gear on the motor shaft upon the teeth of the sliding internal spiral gear during initial rotation of the motor shaft in forward and reverse direction, respectively.

Referring to the drawings by numerals, 1 designates the electric motor on the armature shaft 2 of which is fixed a pulley 3 connected by a belt 4 with a pulley 5 on the counter shaft 6. A pinion 7 on the counter shaft meshes with the gear 8 on the shaft of the drum 9 upon which the hoisting cable 10 is wound. It will be understood, however, that any other suitable mechanism driven by the motor 1 may be provided for rotating the hoisting drum and that the usual drum-releasing clutch, not shown, is provided at a suitable point in the train of driving gearing for permitting lowering of the hoisting tackle by gravity when desired, and also that the usual manually operated friction brake for controlling the speed of rotation of the drum in lowering the tackle and arresting the drum may be provided.

It will be obvious that when the circuit through the motor is broken to stop the motor upon elevation of the load to the desired point, or when the current is broken from any other cause such as blowing of a fuse, the pull of the load on cable 10 will cause the drum 9 to rotate in the reverse direction and the load will drop unless some means is provided for preventing reversal of movement of the driving mechanism as the armature shaft of an electric motor is free to rotate in either direction when the motor circuit is broken.

To prevent dropping of the load under such conditions, I have provided means for automatically locking the armature shaft 2 of the motor 1 against reverse rotation. This locking mechanism comprises a circular metallic housing 11 supported on integral standards 12 bolted to the bed 13 of the hoisting apparatus. The inner wall of the housing 11 is provided with a central aperture 14 through which the end of the armature shaft 2 extends. A spiral gear 15 having a cup-shaped hub is rigidly held on the armature shaft 2 within the housing 11 by a key 17. An annular locking gear 16 having internal spiral teeth is mounted in the casing 11 to slide endwise into and out of mesh with gear 15, said annular locking gear 16 being provided with a series of transversely extending ribs 18 at spaced points around its periphery slidably engaged in recesses or guide ways 19 formed in the annular wall of housing 11. The outer face of housing 11 is closed by a removable plate 20 secured to the housing by screws or bolts 21.

A light spring 22 comprising a dished ring of resilient metal normally of frusto-conical form is interposed between gear 16 and the face plate 20 of the housing. The face plate 20 is preferably provided with an annular channel 23 for receiving the spring 22 and the hub of gear 15 extends through the opening in the annular spring to a point closely adjacent the face plate 20. This construction prevents derangement of the spring.

The spring 22 constantly urges gear 16 in a direction to start the teeth thereon into mesh with the teeth on gear 15 so that when the motor shaft 2 stops rotating in a forward direction, the spring will start the teeth of gear 16 into mesh with the teeth of gear 15 and a very slight reverse rotation of the motor shaft will cause gear 15 to cam the sliding locking gear 16 into complete mesh with gear 15, as shown in Fig. 7. In this position the locking gear will abut against the inner side wall of the housing and the motor shaft will be locked against further reverse rotation and lowering of the load will be prevented. When the motor is again started, the locking gear 16 will be cammed out of mesh with gear 15, as shown in Figs. 5 and 8, and held in the position shown in Fig. 6 until the motor again stops. It will be observed that only a very slight reverse rotation of the armature shaft of the motor is necessary to cam locking gear 16 to locking position so that the shaft and hoisting drum 9 will be locked against reverse rotation before the load lowers sufficiently to acquire any momentum, thus avoiding shocks which would damage the hoisting apparatus. It will be observed also that the shaft 2 is held against reverse rotation by positively interlocked gear teeth so that slippage is impossible even when very heavy loads are suspended from the hoisting tackle.

What I claim is:

1. In an electric motor operated hoisting apparatus, the combination of a spiral gear fixed on the motor shaft, an annular gear having internal spiral teeth adapted to mesh with the teeth of the gear on the motor shaft, and means for guiding the annular gear to move endwise relatively to the other gear into and out of mesh therewith.

2. In an electric motor operated hoist, the combination of a spiral gear fixed on the armature shaft of the motor, a slidably and non-rotatably mounted spiral gear movable endwise into and out of mesh with the gear on the armature shaft, and resilient means tending to normally slide the endwise movable gear into mesh with the gear on the armature shaft.

3. Means for locking the armature shaft of an electric hoist motor against reverse rotation comprising a pair of spiral gears mounted for relative endwise movement into and out of mesh with each other, one of said gears being locked against rotation and the other being rotatable with the armature shaft of the motor.

4. Means for locking the armature shaft of an electric hoist motor against reverse rotation comprising a pair of spiral gears mounted for relative endwise movement into and out of mesh with each other, one of said gears being locked against rotation and the other being rotatable with the armature shaft of the motor, and means constantly urging one of the gears endwise in a direction to start the teeth thereon into mesh with the teeth on the other gear.

5. In an electric motor operated hoist, the combination of a spiral gear fixed on the armature shaft of the motor, a cylindrical housing surrounding said gear, an annular gear in the housing provided with internal spirally extending teeth, means forming an interlocking sliding connection between the annular gear and the annular wall of the cylindrical housing to permit the annular gear to be cammed endwise in one direction out of mesh with the other gear when the motor shaft is rotated in one direction, and yieldable means normally urging the annular gear endwise in the opposite direction.

6. The combination with an electric motor, of a housing having a cylindrical chamber into which the armature shaft of the motor projects through the center of one end wall of the housing, a spiral gear fixed on the motor shaft having a toothed portion adjacent one end wall of the housing and an elongated hub extending closely adjacent the other end wall of the housing, an endwise slidable annular locking gear having internal spirally extending teeth, means holding the locking gear in the housing against rotation and for guiding the same endwise into and out of mesh with the gear on the armature shaft, and a dished resilient annular member surrounding the hub of the gear on the armature shaft and interposed between one face of the locking gear and the adjacent end wall of the housing.

7. In an electric motor operated hoisting apparatus, the combination of a spiral gear rotatable with a part of the hoisting drum driving means, an annular locking gear having internal spirally arranged teeth, means for slidably and non-rotatably supporting the locking gear, and resilient means normally urging the locking gear into mesh with the other gear.

8. Means for preventing reverse rotation of the hoisting drum of an electric motor operated hoist when the motor circuit is broken, comprising a spiral gear rotatable with a part of the drum driving means, a slidably and non-rotatably mounted spiral locking gear movable endwise into and out of mesh with the other gear, and resilient means for normally urging the locking gear into mesh with the other gear.

9. Means for preventing reverse rotation of the hoisting drum of an electric motor operated hoist upon breakage of the motor circuit, comprising a spiral pinion rotatable with a part of the drum driving means, an annular locking gear having internal spirally extending teeth and external transversely extending ribs, a housing surrounding the gears having guide ways extending transversely of the gears in which the ribs on the locking gear slidably engage, and resilient means normally urging the locking gear into mesh with the spiral pinion.

10. Means for preventing reverse rotation of the hoisting drum of an electric motor operated hoist upon breakage of the motor circuit, comprising a spiral pinion rotatable with a part of the drum driving means, a slidably and non-rotatably mounted locking device adapted to be cammed endwise into interlocked relation with the pinion when the pinion is rotated in one direction and cammed out of interlocked relation with the pinion when the pinion is rotated in the opposite direction, and resilient means normally forcing the locking device endwise toward the pinion.

In testimony whereof I hereunto affix my signature.

LUXA CARLO VITTORIO.